(12) United States Patent
Asghar et al.

(10) Patent No.: US 7,386,030 B2
(45) Date of Patent: Jun. 10, 2008

(54) AUTOMATIC THRESHOLD SELECTION METHOD FOR IMPROVING THE DETECTION OF A WIRELESS SIGNAL

(75) Inventors: Ziad Asghar, San Diego, CA (US); Gibong Jeong, San Diego, CA (US); Ashwin Sampath, San Diego, CA (US)

(73) Assignee: Texas Instruments Incorporated, Dallas, TX (US)

( * ) Notice: Subject to any disclaimer, the term of this patent is extended or adjusted under 35 U.S.C. 154(b) by 606 days.

(21) Appl. No.: 10/885,345

(22) Filed: Jul. 6, 2004

(65) Prior Publication Data

US 2005/0181731 A1    Aug. 18, 2005

Related U.S. Application Data

(60) Provisional application No. 60/545,420, filed on Feb. 17, 2004.

(51) Int. Cl.
*H04B 1/00* (2006.01)
(52) U.S. Cl. ..................................... 375/142
(58) Field of Classification Search ............... 375/142, 375/259, 130, 285, 316, 349; 370/328, 332, 370/333; 455/522, 63.1, 67.11, 137–138
See application file for complete search history.

(56) References Cited

U.S. PATENT DOCUMENTS

| | | | |
|---|---|---|---|
| 6,650,912 B2 | 11/2003 | Chen et al. | |
| 7,010,322 B2 * | 3/2006 | Kim et al. | 455/522 |
| 2003/0064743 A1 * | 4/2003 | Chen | 455/522 |
| 2003/0123598 A1 * | 7/2003 | Gollamudi et al. | 375/377 |
| 2003/0179727 A1 * | 9/2003 | Soong et al. | 370/328 |
| 2003/0231706 A1 * | 12/2003 | Hwang | 375/219 |

OTHER PUBLICATIONS

Sarkar, S., et al., "Phone Standby Time in cdma2000: The Quick Paging Channel in Soft Handoff," IEEE Transactions on Vehiclular Technology, Sep. 2001, pp. 1240-1249, vol. 50, No. 5, IEEE, Los Alamitos, CA, US.

* cited by examiner

*Primary Examiner*—Khanh C. Tran
(74) *Attorney, Agent, or Firm*—Ronald O. Neerings; Wade J. Brady, III; Frederick J. Telecky, Jr.

(57) ABSTRACT

System and method for improving the detection performance of a wirelessly transmitted signal. A preferred embodiment comprises specifying a desired response for missed channel detection and false alarm probabilities for a plurality of signal qualities and determining if a channel detection threshold is based on missed channel detection or false alarm probabilities for the plurality of signal qualities. A signal quality estimate of a channel can be inferred from a signal quality measurement of a second channel, wherein the channel and the second channel are sourced by a single transmitter. The channel detection threshold can be adjusted based upon the previously determined required response and the signal quality estimate of the channel.

27 Claims, 7 Drawing Sheets

AUTOMATIC THRESHOLD SELECTION METHOD FOR IMPROVING THE DETECTION OF A WIRELESS SIGNAL

This application claims the benefit of U.S. Provisional Application No. 60/545,420, filed Feb. 17, 2004, entitled "Automatic Threshold Selection Method for Improving the Detection of a Wireless Signal" which application is hereby incorporated herein by reference.

TECHNICAL FIELD

The present invention relates generally to a method for digital communications, and more particularly to a method for improving the detection performance of a wirelessly transmitted signal.

BACKGROUND

In many wireless communications systems, such as Universal Mobile Telephony Systems (UMTS) and other third generation (3GPP) wireless communications systems, a communications device is often put into a sleep mode in order to decrease power consumption and increase battery life. The communications device can then wake up at fixed intervals to check if it is the recipient of an incoming page. In UMTS, this is referred to as the DRX mode, or discontinuous reception mode.

To further reduce the amount of time that the communications device needs to be active when it is operating in the DRX mode, the communications device can decode an indicator channel which can contain a Boolean value specifying if it is the recipient of an incoming page. If there is no incoming page, then the communications device can go back to sleep. If there is an incoming page, then the communications device can decode the paging channel to receive the details of the incoming page (or simply, receive the incoming message).

The quality of the wireless channel can have a significant impact on the accuracy of the decoding of the channel. For a low quality channel, perhaps due to the communications device being far removed from the base station to which it is communicating or the communications device being operated within a tunnel or large building, the signal quality of the channel (commonly referred to as signal-to-noise ratio (SNR)) can be low. When the SNR of the indicator channel is low, then the probability of the communications device erroneously decoding the indicator channel can be high. Conversely, when the SNR of the indicator channel is high, then the probability of erroneously decoding the indicator channel can be low. If the indicator channel is erroneously decoded, the communications device may erroneously decode the indicator channel one of two ways: a false alarm or a missed page. With a false alarm, the communications device would decode the indicator channel as indicating that there is an incoming page when there isn't one, thereby unnecessarily increasing power consumption and reducing battery life. While with the missed page, the communications device would decode the indicator channel as not indicating that there is an incoming page when there is an incoming page resulting in a missed call (since the presence of a page is usually followed by a call).

A commonly used method for detecting the state of the indicator channel is referred to as the maximum likelihood (ML) method. The ML method uses a zero threshold and assumes that the a priori probabilities of being paged and not being paged are the same and that the costs of erroneously decoding the indicator channel (the false alarm and missed page) are the same.

Another commonly used method for detecting the state of the indicator channel is referred to as the Neyman Pearson (NP) method. The NP method permits a threshold to be set with unequal false alarm and missed detection probabilities. The NP method is typically used to set a performance metric, such as a constant missed detection (or false alarm) probability across the range of SNRs, and then the other performance metric, i.e., false alarm (or missed detection) probability can be automatically determined. Essentially, there is one degree of freedom since there is only one threshold to set with two performance metrics. Therefore, setting the threshold based upon one performance metric would result in the automatic determination of the other performance metric.

One disadvantage of the prior art is that the ML method permits only the assignment of equal costs for erroneously decoding the state of the indicator channel as either a missed page or false alarm. Furthermore, it also assumes that the probability of being paged and not being paged are equal. These assumptions are incorrect in real-world applications and their use can result in poor performance.

A second disadvantage of the prior art is that the NP approach does not adapt the threshold by taking into consideration the fact that the sensitivity of the overall performance metrics (battery life and missed call rate) to PICH detection may change over an entire range of SNRs (or equivalently, the location of the communications device in relation to a cell site). Rather, the NP approach attempts to keep either the missed PICH rate or the false alarm probability constant over the entire range of SNRs.

SUMMARY OF THE INVENTION

These and other problems are generally solved or circumvented, and technical advantages are generally achieved, by preferred embodiments of the present invention which provides for a system and method for improving the detection performance of a wireless transmitted signal.

In accordance with a preferred embodiment of the present invention, a method for detecting a value transmitted on a channel received by a receiver, the method comprising inferring a signal-to-noise ratio (SNR) for the channel and selecting a channel detection threshold based upon the inferred SNR. The method further comprises applying a detection rule with the selected channel detection threshold.

In accordance with another preferred embodiment of the present invention, a method for customizing the detection of a value transmitted on a channel received by a receiver, the method comprising specifying a desired response for a missed channel detection probability and a false alarm probability for a plurality of signal qualities. For each of the plurality of signal qualities specified, the method includes determining if a channel detection threshold is to be based upon the missed channel detection or false alarm probability and setting a threshold based upon the determined channel detection threshold. Furthermore, a signal-to-noise ratio (SNR) is inferred for the channel and a channel detection threshold is selected using the inferred SNR and results from the determining. Finally, a detection rule can be applied with the selected channel detection threshold.

An advantage of a preferred embodiment of the present invention is that it is possible to design a customized response for either the missed detection or false alarm probability across the range of SNRs (or equivalently, across different locations in the coverage area of a communications cell). A customized response may be desirable since the indicator channel detection performance can be one component of overall missed call performance and the sensitivity of the overall paging channel detection performance to the indicator channel detection may not be uniform across the range of SNRs.

A further advantage of a preferred embodiment of the present invention is that it can permit the capping of the false alarm probability to a value where its influence on the overall power consumption (and battery life) of the communications device is negligible. With the false alarm probability capped, it can be possible to reduce the missed indicator channel detection probability. This can allow for the customization of the missed indicator channel detection probability in certain SNR ranges and the false alarm probability in other SNR ranges.

Yet another advantage of a preferred embodiment of the present invention is that it is possible to correctly calculate the noise variance that is to be used in threshold setting. The noise variance calculation in the present invention can correctly account for noisy channel estimates used in PICH demodulation. This accurate calculation of the noise variance can also help in the detection based upon the NP method.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a UMTS wireless communications system using a paging indicator channel. An introduction to the technical specifications for a UMTS wireless communications system may be found in a document entitled "$3^{rd}$ Generation Partnership Project; Technical Specifications Group Services and System Aspects General UMTS Architecture (Release 4)," published March 2004. The invention may also be applied, however, to other wireless communications systems that make use of an indicator channel to help in the decoding of another channel, such as CDMA2000, CDMA ONE, GSM, and so forth. Furthermore, the invention has application in the detection of wirelessly transmitted signals.

Figure 1:
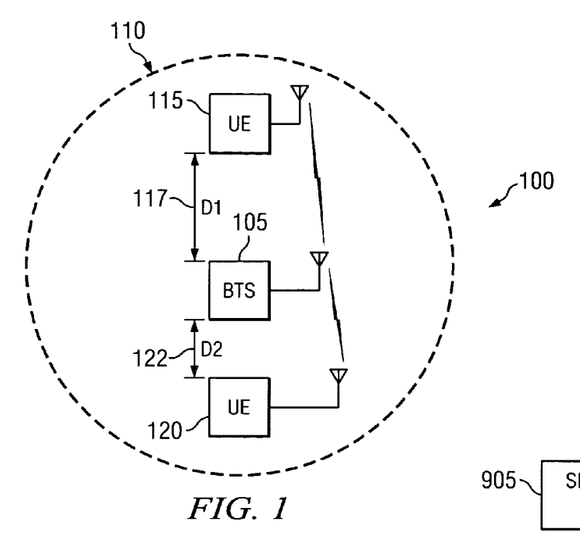
FIG. 1 is a diagram of an operating area coverage map of a wireless communications system.

With reference now to FIG. 1, there is shown a diagram illustrating an operating area coverage map of a wireless communications system 100. The wireless communications system 100, which can be a UMTS wireless communications system, comprises a base station (BTS) 105. The BTS 105 can have an operating area that can be represented by a dashed circle 110. Note that the dashed circle 110 may be an idealized view of the operating area of the BTS 105 and that an actual operating area may be irregularly shaped, depending upon the presence (or lack) of physical barriers to signals transmitted by the BTS 105.

The wireless communications system 100 may also include a pair of communications devices, a first communications device 115 and a second communications device 120. The communications devices may also be referred to as user equipment (UE) or mobile. Note that for illustrative purposes, the wireless communications system 100 is shown with two communications devices and that the wireless communications system 100 may actually have more (or fewer) communications devices. The first communications device 115 can be separated from the BTS 105 by a distance 'D1,' shown as a first dashed line 117, while the second communications device 120 may be separated from the BTS 105 by a distance 'D2,' shown as a second dashed line 122. As shown in FIG. 1, the distance 'D1' is greater than the distance 'D2.' Therefore, the signal from the BTS 105 to the first communications device 115 should be weaker than the signal from the BTS 105 to the second communications device 120.

In a UMTS wireless communications network, a communications device can be placed in a sleep mode wherein it can periodically wakeup to determine if there is an incoming page. If there are no incoming pages, the communications device can return to sleep. This mode of operation is referred to as discontinuous reception mode (DRX). When in DRX mode, the communications device can considerably reduce its power consumption as compared to a fully active communications device. To further help reduce the power consumption, the communications device does not have to attempt to decode a paging channel (PCH) for a message that may not be present. Rather, the communications device decodes a paging indicator channel (PICH) for a single Boolean value that indicates if there is an incoming page, which, if positive, would then cause the communications device to decode the PCH to receive the message. Since the decoding of a single Boolean value is typically much shorter than the decoding of a message and the probability of an incoming page being present each time the communications device wakes up is small, the decoding of the PICH for the single Boolean value can reduce the power consumption of the communications device. Please refer to U.S. Pat. No. 6,650,912, entitled "Selecting Paging Channel Mode" for a detailed discussion of the use of a paging indicator channel to reduce power consumption in a wireless communications device. Additional discussion of the use of paging indicator channels to reduce power consumption and increase standby time can be found in a technical paper by S. Sarkar, B. Butler, and E. Tiedemann, entitled "Phone Standby Time in cdma2000: The Quick Paging Channel in Soft Handoff," IEEE Transactions on Vehicular Technology, volume 50, pp 1240-1249, published September 2001.

Figure 2:
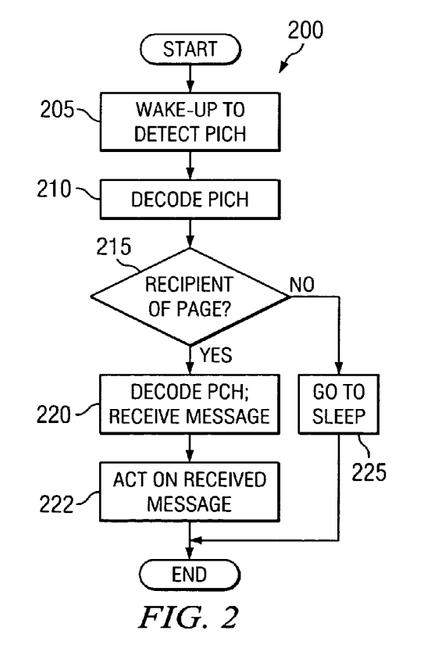
FIG. 2 is a diagram of an algorithm that can be used by a communications device for detecting incoming pages while operating in a DRX mode.

With reference now to FIG. 2, there is shown a flow diagram illustrating an algorithm 200 that can be used by a communications device for detecting incoming pages while operating in DRX mode. The algorithm 200 illustrates a sequence of operations that can be executed by a processing element, controller, general purpose processing unit, special purpose processing unit, custom designed integrated circuit, or so on in a communications device to detect and receive incoming pages while the communications device is operating in the DRX mode. As discussed previously, the communications device may operate in the DRX mode when it is not in active use, in order to reduce power consumption. When in the DRX mode, the communications device reads an indicator channel (also referred to as a paging indicator channel) to determine if it should read the paging channel to receive an incoming message.

When in the DRX mode, the majority of the time, the communications device is in a sleep mode (or a suspend mode). Then, at periodic intervals, the communications device wakes up to read the indicator channel (PICH) (block 205). In a UMTS wireless communications channel, the PICH can carry a flag (or Boolean value) that can be set or un-set depending on whether or not the communications device is being paged. The duration of the interval that the communications device spends sleeping can be dependent upon factors such as the length of the DRX cycle as specified by UTRAN, the length of the wake up time, and so forth.

After waking up, the communications device can detect and decode the PICH (block 210). Since the PICH basically conveys a single value to the communications device, the detecting and decoding of the PICH by the communications device should occur in short order. The communications device can then determine if it is the recipient of a page (block 215) based upon the value of the flag. If the communications device determines that it is the recipient of a page, then the communications device should decode the paging channel (PCH) in order to receive the message (block 220). After completing its reception of the page, the communications device can act upon the received message (block 222). For example, the communications device can proceed to a traffic channel (as specified in the received message) and begin two-way (or one-way) communications, such as a voice call with another user or a data call with a data source/sink. If the communications device determines that it is not the recipient of a page, then the communications device can place itself back to sleep (block 225).

PICH detection directly affects the two important metrics of battery life and missed call rate and therefore it is imperative that the PICH be decoded correctly with high probability. The PICH can be decoded incorrectly in one of two ways: a false alarm or a missed page. A false alarm occurs when the PICH is decoded as indicating that the communications device is the recipient of a page when it actually is not. A false alarm can result in an increase in power consumption since the communications device must attempt to decode the PCH for a page that is not there. A missed page occurs when the PICH is decoded as indicating that the communications device is not the recipient of a page when it actually is. A missed page can result in a missed call since the communications device does not know that it is being paged.

Figure 3:
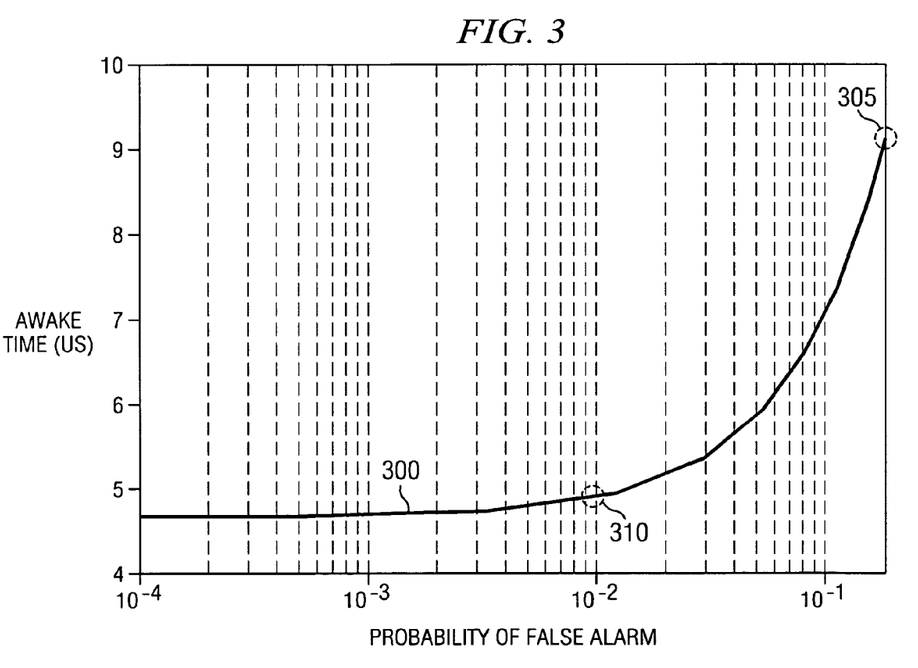
FIG. 3 is a data plot of a communications device's awake time versus the probability of false alarm in a static channel environment, according to a preferred embodiment of the present invention.

With reference now to FIG. 3, there is shown a data plot illustrating a communication device's awake time (an average duration for which the communications device is active per DRX cycle) versus probability of PICH false alarm in a static channel environment, according to a preferred embodiment of the present invention. The amount of time that the communication device spends awake when operating in the DRX mode can be expressed as:

$$\text{Awake\_time} = T_{PICH} + [P_{fa}(1-P_{page}) + (1-P_m)P_{page}] T_{PCH}$$

$$\text{Awake\_time} \approx T_{PICH} + P_{fa} * T_{PCH},$$

wherein $T_{PICH}$ is the amount of time that the communications device spends to decode the PICH, $T_{PCH}$ is the amount of time that the communications device spends to decode the PCH, $P_{fa}$ is the probability of a false alarm, $P_{page}$ is the probability of being paged, and $P_m$ is the probability of a missed page. The approximation for Awake_time arises from the fact that the probability of being paged in a single DRX cycle can be very small.

A curve 300 displays the amount of time that the communications device spends awake for different values of $T_{fa}$. The curve 300 shows that when the probability of a false alarm drops from 20% (indicated in FIG. 3 as highlight 305) to 1% (indicated in FIG. 3 as highlight 310), the awake time of the communications device drops by approximately a factor of two (2). However, reducing the probability of a false alarm below 1%, results in a negligible reduction in the awake time. Therefore, it is clear that reducing the probability of false alarm below a certain point (approximately 1% to 5%) may not be beneficial.

Figure 4:
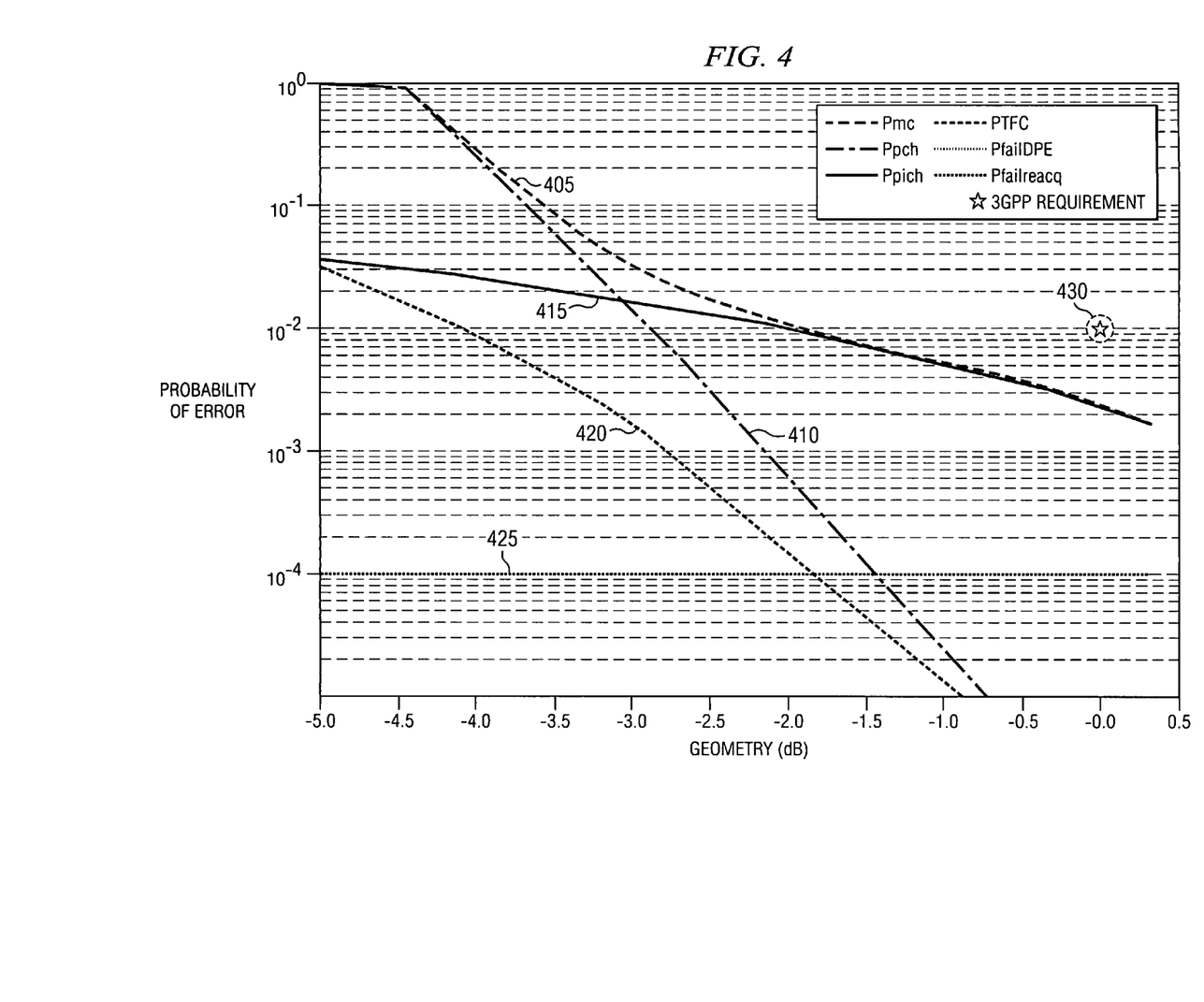
FIG. 4 is a data plot of contributions to a missed page as a function of signal geometry, according to a preferred embodiment of the present invention.

With reference now to FIG. 4, there is shown a data plot illustrating contributions to a missed page as a function of signal geometry, according to a preferred embodiment of the present invention. Note that signal geometry is a quantity that is directly proportional to the signal-to-noise ratio (SNR) of the signal. In some cases, SNR can be used in place of signal geometry and still convey a similar meaning. When operating in the DRX mode, the missed call rate can be dependent upon several contributors and can be expressed as:

$$P_{mc} = 1 - (1-P_{fail\_racq})(1-P_{fail\_DPE})(1-P_{TFC})(1-P_{PCH})(1-P_{PICH})$$

wherein $P_{fail\_reacq}$ is the probability of error due to real-time clock (RTC) calibration error, $P_{fail\_DPE}$ is the probability of a missed paging indicator due to a searcher error, $P_{TFC}$ is the probability of a missed paging indicator due to a transport format combination (TFC) decoding error, $P_{PCH}$ is the decoder error probability on the PCH, and $P_m$ is the probability of a missed PICH.

FIG. 4 displays the contributions to $P_{mc}$ for each of the contributors for a range of SNR values. A first curve 405 displays $P_{mc}$ for the range of signal geometries. A second curve 410 displays the contribution to $P_{mc}$ of $P_{PCH}$, while a third curve 415 displays the contribution of $P_{PICH}$. A fourth curve 420 displays the contribution of $P_{TFC}$. A fifth curve 425 displays the contributions of $P_{fail\_reacq}$. Note that $P_{fail\_DPE}$ is much lower and hence not shown in FIG. 4. A single point 430 displays a required missed call probability at a single signal geometry (0 dB). The single point 430 displays a performance requirement as specified by the UMTS technical standards.

The contributors to the missed call rate $P_{mc}$ can have different signal geometry ranges wherein they are dominant. For example, for a signal geometry range of less than -3 dB, the dominant contributor to $P_{mc}$ is $P_{PCH}$, the decoded error probability on the PCH. For a signal geometry range of greater than -3 dB, the dominant contributor to $P_{mc}$ is $P_{PICH}$.

As discussed previously, the setting of a threshold that is used for detecting the value of the Boolean value carried on the PICH presents a tradeoff between missed detection (resulting in a missed call) or false alarm (directly affecting battery life and standby time). The changing of the threshold to decrease one (either missed detection or false alarm probability) comes at the expense of increasing the other. For example, using a given detection method, if the missed detection probability is lowered through the setting of a threshold, then the false alarm probability will correspondingly increase.

Since the probability of a missed call can be dominated by different factors depending upon the quality of the signal (for example, signal geometry or SNR), it can be possible to trade missed detection and battery life. In situations with low signal quality (low signal geometry or SNR) or equivalently, operation at the edge of operating areas, the missed call rate is dominated by high error probability of the PCH itself. Therefore, the overall paging channel detection performance may not be sensitive to PICH detection. In this instance, setting a missed PICH detection probability of 1% or lower could be wasteful. Setting the missed PICH detection probability at a higher percentage (10-50%, for example) can result in similar performance with a better battery life. In situations with intermediate signal quality (medium signal geometry or SNR), a missed call probability may require that the missed PICH detection probability be very small (for example, 0.1 to 0.5%). Furthermore, the false alarm probability may be capped at 5 to 10% for higher signal quality situations (high signal geometry or SNR), since it makes little difference to the battery life if it is set at a lower level (as shown in FIG. 3), and then the missed PICH detection probability can be reduced in these regions.

The dominance of different contributors to the overall missed call rate at different signal quality ranges can permit variations in the setting of the missed PICH detection probability (missed page probability) and the false alarm probability based upon a sensitivity analysis. This may lead to the development of an algorithm that can automatically adjust the PICH detection threshold based upon the quality of the received signal.

The ability to set the detection threshold to trade off the missed PICH detection probability and the false alarm probability at different signal geometries can enable the trading off between missed calls and higher standby time in the different signal geometries. Doing so requires the addition of minimal complexity to the communications device since parameters necessary for use are either already estimated at the communications device (such as the common pilot signal energy and noise variance) or are signaled by the network (such as the common pilot to PICH power offset ratio). Furthermore, some of the estimations and computations can be performed prior to their use, such as during an initial power-on operation or even during communications device manufacture or programming. This is commonly referred to as offline computation, while the computations and estimations performed during use are commonly referred to as online computations.

Figure 5A:
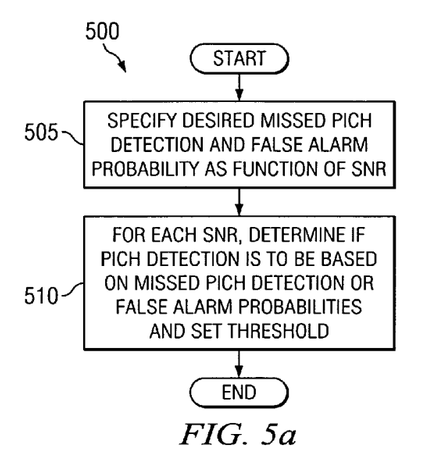
FIGS. 5a and 5b are diagrams of algorithms that can be used for offline and online automatic adjustment of the PICH detection threshold and PICH symbol decoding, according to a preferred embodiment of the present invention.
Figure 5B:
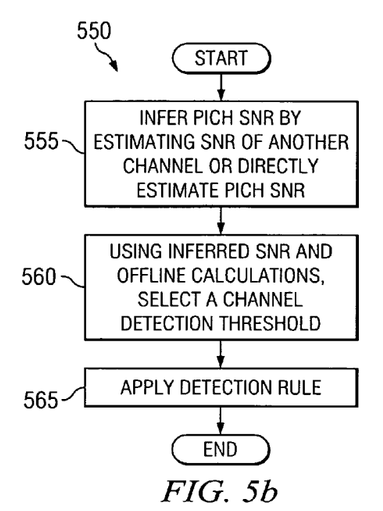

With reference now to FIGS. 5a and 5b, there are shown flow diagrams illustrating algorithms that can be used for offline (algorithm 500, FIG. 5a) and online (algorithm 550, FIG. 5b) computations to automatically adjust the PICH detection threshold, referred to as automatic threshold selection concept (ATC), according to a preferred embodiment of the present invention. According to a preferred embodiment of the present invention, the algorithm 500 may be used to specify and precompute some of the parameters and values used to automatically adjust the PICH detection threshold prior to when a communications device enters the DRX operation mode, while the algorithm 550 can be executed on the communications device while the communications device is operating in the DRX operation mode.

The algorithm 500 can be executed during initial power-on operations or after a reset/reboot operation of the communications device. Alternatively, the algorithm 500 can be executed prior to the manufacture of the communications device or at a service provider prior to the distribution of the communications device to customers. In either case, the parameters and values computed and specified by the algorithm 500 can be stored in the communications device (such as in a memory or a register bank) for subsequent use.

A first operation in the algorithm 500 involves the specifying of a desired response for the missed PICH detection probability ($P_{PICH}$) and the false alarm probability ($P_{fa}$) as a function of the signal quality (signal geometry or SNR) (block 505). For example, it can be possible to specify a different missed PICH detection probability and a false alarm probability for low, medium, and high signal geometry or SNR ranges (such as described previously). Such a desired response could take into account the relative sensitivity of the performance metrics to PICH detection. After specifying a desired response as a function of signal quality (block 505), a second operation in the algorithm 500 determines if the PICH detection threshold will be based upon the missed PICH detection probability or the false alarm probability over the signal geometry or SNR range of interest (block 510). Furthermore, the second operation sets the threshold to be used in the detection rule (also block 510). After the second operation completes, the results of the execution of the algorithm 500 can be stored in the communications device for later use.

According to a preferred embodiment of the present invention, it may be possible to specify a different response (block 505) and a different set of PICH detection thresholds can be determined (block 510) for different missed PICH detection and false alarm probability responses. Each set of PICH detection thresholds can be stored in the communications device. Then, if the performance resulting from a set of PICH detection thresholds is not as expected, then the communications device can switch to a different set of PICH detection thresholds to possibly help improve performance.

The algorithm 500 can be used to produce parameters for the various signal geometry or SNR ranges that can be stored in the communications device for subsequent use. According to a preferred embodiment of the present invention, the parameters can be stored in a look-up table. A preferred embodiment of the look-up table can have three columns of data. A first column can represent the various signal geometry or SNR ranges for which a threshold is specified, a second column can indicate whether the missed PICH detection or false alarm probability is used, and a third column of data can provide the detection threshold itself. The look-up table can have as many rows of data as the number of signal geometry or SNR ranges for which missed PICH detection and false alarm probabilities are specified in block 505. Note that if multiple missed PICH detection and false alarm probability responses are specified, then multiple look-up tables can be stored in the communications device. Alternatively, a single large look-up table can be used to stored the thresholds for the multiple missed PICH detection and false alarm probability responses. The use of a look-up table and its design is considered well understood by those of ordinary skill in the art of the present invention and will not be discussed herein.

The algorithm 550, which was described previously, can execute on a communications device while the communications device is operating in the DRX operating mode. According to a preferred embodiment of the present invention, the algorithm 550 is executed each DRX cycle by the communications device. The communications device can begin by estimating the SNR of the PICH by estimating the SNR of another channel (block 555). Alternatively, the SNR of the PICH can be directly estimated. The estimation of the SNR is performed using a channel that is also being signaled by the network, just as the PICH. For a UMTS wireless communications system, the channel used maybe the common pilot channel (CPICH) because the power offset between the PICH and the CPICH is signaled to the communications device by the network. However, other channels that are also signaled by the network can be used in the estimation of the SNR if the power offset between the channels is known. The estimated SNR of the other channel can then be used as the inferred SNR of the PICH. After inferring the SNR of the PICH, the communications device can select a channel detection threshold using both the inferred SNR and previously calculated information regarding if the PICH detection threshold should be set based on missed PICH detection probability or false alarm probability (block 560). The information regarding if the PICH detection threshold should be set based on missed PICH detection probability or false alarm probability was previously calculated using algorithm 500 (FIG. 5a) and stored in memory. Finally, the communications device apply the detection rule (block 565). The application of the detection rule can differ based upon the way in which data from the fingers of the rake receiver is combined in the communications device. The application of the detection rule for two different methods of combining finger data is presented below. Note that it may be possible for the quality of PICH to change during operation. The communications device can then adjust the threshold based upon the PICH SNR.

In a UMTS wireless communications system, the PICH can indicate a single bit of information to the communications device, wherein the single bit of information is modulated using binary-phase shift keying (BPSK) and can take on one of two values: +1 (indicating that the communications device is not being paged) and −1 (indicating that the communications device is being paged). Assuming an L path communications channel, the received signal after de-spreading by a rake receiver can be written in vector form and expressed as:

$$\tilde{x} = \sqrt{E_P/2} A(1+j)\underline{\alpha} e^{j\underline{\theta}} + \underline{\tilde{w}}.$$

where it is assumed that the transmitted PICH symbol is $\sqrt{E_P/2}A(1+j)$, A can have the value of either +1 or −1 wherein a +1 can indicate that the communications device is not being paged and a −1 can indicate that the communications device is being paged, the complex channel gain is given by $\underline{\alpha} e^{j\underline{\theta}} = [\alpha_1 e^{j\theta_1} \alpha_2 e^{j\theta_2} \ldots \alpha_L e^{j\theta_L}]$ and the additive noise vector is $\underline{\tilde{w}}$. It is assumed here that $\underline{\tilde{w}}$ is a multivariate Gaussian random vector with zero mean and uncorrelated elements. The variances of real and imaginary parts of $\tilde{w}_i$ are each $\sigma_i^2/2$. (Note that this noise variance includes any inter-path interference and therefore, in general, is path dependent). Multiplying $\tilde{x}$ by $(1-j)/\sqrt{2}$ yields the new vector, expressible as:

$$\underline{x} = \sqrt{E_P} A \underline{\alpha} e^{j\underline{\theta}} + \underline{w}.$$

Note that the statistics of the noise vectors $\underline{w}$ and $\underline{\tilde{w}}$ are identical. The corresponding received CPICH (i.e. pilot) symbols are expressible as:

$$\underline{x} = \sqrt{E_C} A \underline{\alpha} e^{j\underline{\theta}} + \underline{n},$$

where the noise vector $\underline{n}$ is a multi-variate Gaussian random vector with zero mean and uncorrelated elements. The variances of real and imaginary parts of $n_i$ are $\sigma_i^2/2$. The vectors $\underline{n}$ and $\underline{w}$ are mutually uncorrelated as well. Note that the assumption that the per path noise variance for the PICH symbol and the CPICH symbol are the same is not essential for the ensuing analysis and only simplifies the presentation.

The threshold setting should be a function of the noise variances in both the CPICH and PICH because the CPICH is used for channel estimation and subsequent coherent demodulation of the PICH. The analysis shown here, correctly accounts for noisy channel estimates used in PICH demodulation. Note that the analysis here and resultant methodology will also make detection using the Neyman-Pearson method more accurate in the presence of a practical channel estimation. It is also known that even though the channel estimates are represented as pilot symbols, they may also be obtained by averaging or filtering the pilot symbols.

One commonly used method for combining finger data is maximal ratio combining (MRC). In MRC, the data from each finger in the rake receiver can be weighed by a quantity that is proportional to the SNR of the path being demodulated by that finger, so that data from paths with greater SNR has greater significance in the decision statistic. The log-likelihood ratio (LLR) for the paging indicator bit (conditioned on the channel gain) is expressible as:

$$L_{\log}(\underline{x}) = \log\frac{P(\underline{x}\mid A=-1)}{P(\underline{x}\mid A=1)} = \sum_{i=1}^{L}\log\frac{P(x_i\mid A=-1)}{P(x_i\mid A=1)},$$

where the second equality is a result of assuming independence among the paths. It follows then, that:

$$L_{\log}(\underline{x}) = \sum_{i=1}^{L} -\frac{4\sqrt{E}}{\sigma_i^2}[\operatorname{Re}\{\alpha_i e^{-j\theta_i}x_i\}].$$

Now, the hypothesis test is to compare $L_{log}(\underline{x})$ to a threshold as follows:

$$L_{\log}(\underline{x}) = \sum_{i=1}^{L} -\frac{4}{\sigma_i^2}\operatorname{Re}\{\alpha_i\sqrt{E}\,e^{-j\theta_i}x_i\} \underset{H_0}{\overset{H_1}{\gtrless}} \log(\gamma).$$

In practice channel estimates from the CPICH would be used for demodulation and therefore, the hypothesis test is:

$$L_{\log}(\underline{x}) = \sum_{i=1}^{L} -\frac{4}{\hat{\sigma}_i^2}\operatorname{Re}\{\hat{\alpha}_i\sqrt{E}\,e^{-j\hat{\theta}_i}x_i\} \underset{H_0}{\overset{H_1}{\gtrless}} \log(\gamma).$$

Figure 6A:
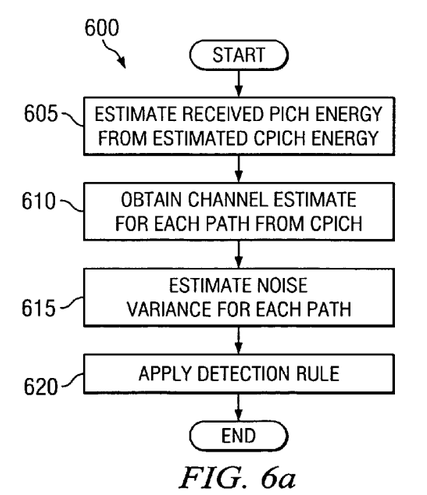
FIGS. 6a and 6b are diagrams of an algorithm used for PICH detection when a rake receiver in the communications device uses maximal ratio combining or pilot weighted combining, according to a preferred embodiment of the present invention.

With reference now to FIG. 6a, there is shown a flow diagram illustrating an algorithm 600 used in PICH detection when a rake receiver in the communications device uses maximal ratio combining, according to a preferred embodiment of the present invention. According to a preferred embodiment of the present invention, the algorithm 600 can be an implementation of block 565 (FIG. 5b), wherein the detection rule is applied using information generated by algorithm 500, which may be stored in a look-up table.

An initial operation (block 605) in the algorithm 600 can be to estimate the received PICH bit energy from the estimate of the CPICH bit energy ($\hat{\alpha}_i^2\hat{E}_b^{CPICH}$) for each path in the communications channel and the CPICH to PICH offset (in db), referred to as $\Delta_{PICH}$, which is signaled by the network. With these estimated values, $\hat{\alpha}_i^2\hat{E}_P = \hat{\alpha}_i^2\hat{E}_C*10^{\Delta_{PICH}/10}$ is known. It may be then possible to obtain channel estimates for each path from the CPICH, $\hat{\theta}_i$ (block 610). Alternatively, the first and second operations (blocks 605 and 610) can be combined into a single operation by computing a complex channel estimate from the CPICH and then scaling it by the square root of the PICH offset. Note that with a zero threshold (such as when a ML detector is used), the PICH offset would then not have a role in the decision rule.

After estimating the received PICH bit energy (block 605) and the channel estimates for each path (block 610), the third step can be to obtain an estimate of the noise variance for each path, $\hat{\sigma}_i^2$ (block 615). All of the data needed to perform the hypothesis test is now known, and the PICH detection rule can be applied (block 620).

The threshold, $\log(\gamma)$, is set to attain a certain false alarm or missed PICH detection probability as specified in block 510 of algorithm 500 (FIG. 5a). Shown below is an example of threshold setting for a fixed missed PICH detection probability. It should be noted that threshold setting based upon a false alarm probability is very similar and therefore is not shown.

$$P_m(\gamma) = P\{L_{\log}(\underline{x}) < \log(\gamma)\mid H_1\} = P\left\{\sum_{i=1}^{L}\frac{4}{\hat{\sigma}_i^2}\operatorname{Re}\left[\hat{\alpha}_i\sqrt{E}\,e^{-j\hat{\theta}_i}x_i\right] > -\log(\gamma)\right\}$$

The threshold is obtained as:

$$\log\gamma = \begin{cases} \arg\{P_m(\gamma) = P_{m,target}(SNR)\} & \text{threshold based on } MP \\ \arg\{P_m(\gamma) = P_{fa,target}(SNR)\} & \text{threshold based on } FA \end{cases}$$

An accurate method for setting the threshold would be to determine the missed PICH detection probability expression that considers the statistics of the estimates $\hat{\alpha}_i$ and $\hat{\sigma}_i^2$, in addition to the noise present in $x_i$. For MRC, this is often intractable, because of the statistics of the noise variance estimate. However, as a sub-optimum approach for MRC, the method presented treats the estimates as deterministic parameters and computes the missed PICH detection probability purely based upon the noise present in $x_i$. With this approach, the decision statistic becomes Gaussian and the missed PICH detection probability can be computed as:

$$P_m(\gamma) = Q\left(\frac{\sum_{i=1}^{L}\frac{4\hat{\alpha}_i^2 E}{\hat{\sigma}_i^2} - \log(\gamma)}{\sqrt{\sum_{i=1}^{L}8\frac{\hat{\alpha}_i^2 E}{\hat{\sigma}_i^2}}}\right)$$

wherein Q is can be expressed as:

$$Q(x) = \int_x^\infty \frac{1}{\sqrt{2\pi}}\exp\left(-\frac{u^2}{2}\right)du.$$

In order to set the threshold for MRC, the PICH SNR is inferred from the estimates of the CPICH SNR and the above equation is inverted. In practice, a look-up table may be used to invert the Q(.) equation above.

Figure 6B:
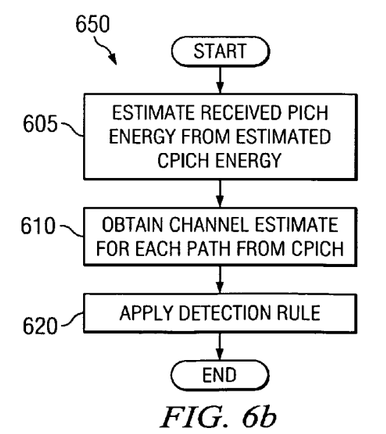

With reference now to FIG. 6b, there is shown an algorithm 650 used in PICH detection when a rake receiver in the communications device uses pilot weighted combining, according to a preferred embodiment of the present invention. As an alternative to MRC, a simpler approach called pilot weighted combining (PWC) is often used. PWC combines each path using the channel estimate of each path. According to a preferred embodiment of the present invention, the algorithm 650 can be an implementation of block 565 (FIG. 5b), wherein the threshold is selected from the results generated by algorithm 500, which may be stored in a look-up table. Note that the algorithm 650 also includes an application of the selected threshold. For PWC, the PICH hypothesis can be expressed as:

$$L_{\log}(\underline{x}) = \sum_{i=1}^{L} -\text{Re}\{\hat{\alpha}_i \sqrt{E_P}\, e^{-j\hat{\theta}_i} x_i\} \underset{H_0}{\overset{H_1}{\gtrless}} \log(\tilde{\gamma}).$$

Note that the algorithm 650 for PWC can be similar to the algorithm 600 for MRC with the exception that the algorithm 650 does not need to estimate the noise variance for each path (block 615 (FIG. 6a)). Unlike in the case of MRC, in PWC, the threshold determination that precisely accounts for noise in both the signal and the channel estimate is possible. As an example, consider a case wherein the channel does not change significantly over a slot duration (for UMTS, 0.667 ms) and that the channel estimates can be obtained by simply averaging the symbols of a pilot received in a slot. For this case, the channel estimate of the i-th path can be expressed as:

$$\hat{\alpha}_i e^{j\hat{\theta}_i} = \frac{1}{N\sqrt{E_C}} \sum_{j=1}^{N} y_{ij} = \frac{1}{N\sqrt{E_C}} \sum_{j=1}^{N} (a_i e^{j\theta_i} \sqrt{E_C} + n_{ij}),$$

where j is the symbol index and there are N CPICH symbols in a slot. The j-th received pilot symbol on the i-th path can be referred to as $y_{ij}$. A one-slot straight average filter of the kind shown above is commonly used for channel estimation on the downlink in CDMA systems. Equivalently, $$\hat{\alpha}_i e^{j\hat{\theta}_i} = a_i e^{j\theta_i} \sqrt{E_C} + \bar{n}_i,$$

where $\bar{n}_i$ is complex Gaussian with a variance of real and imaginary parts equal to $\sigma_i^2/(2N)$. The noise variance has been reduced by a factor of N due to the one-slot averaging.

With this model, each term in the decision statistic, $\text{Re}\{\hat{\alpha}_i e^{-j\hat{\theta}_i} X_i\}$, is no longer strictly Gaussian due to the "product of noise" terms (noise in the channel multiplying noise in the signal). However, at typical operating SNRs, the "product of noise" terms are generally small compared to other noise terms and maybe ignored. The resulting Gaussian approximation can be quite accurate. Setting the Gaussian approximation and matching the mean and variance of each term in the decision statistic, the missed PICH detection probability can be expressed as:

$$P_m(\tilde{\gamma}) = Q\left(\frac{\log\tilde{\gamma} + \mu}{\tilde{\sigma}}\right),$$

$$\mu = \sum_{i=1}^{L} \alpha_i^2 \sqrt{E_C E_P}$$

where $$\tilde{\sigma}^2 = \frac{1}{2}\sum_{i=1}^{L}(\alpha_i^2 \sigma_i^2 (E_C + E_P/N) + \sigma_i^4/N).$$

The threshold $\log(\tilde{\gamma})$ can now be obtained by inverting the expression for the missed PICH detection probability. If the threshold is to be set based upon false alarm probability, a similar approach can be followed. Note that the threshold setting for PWC is similar to that for MRC, as discussed above.

Figure 7A:
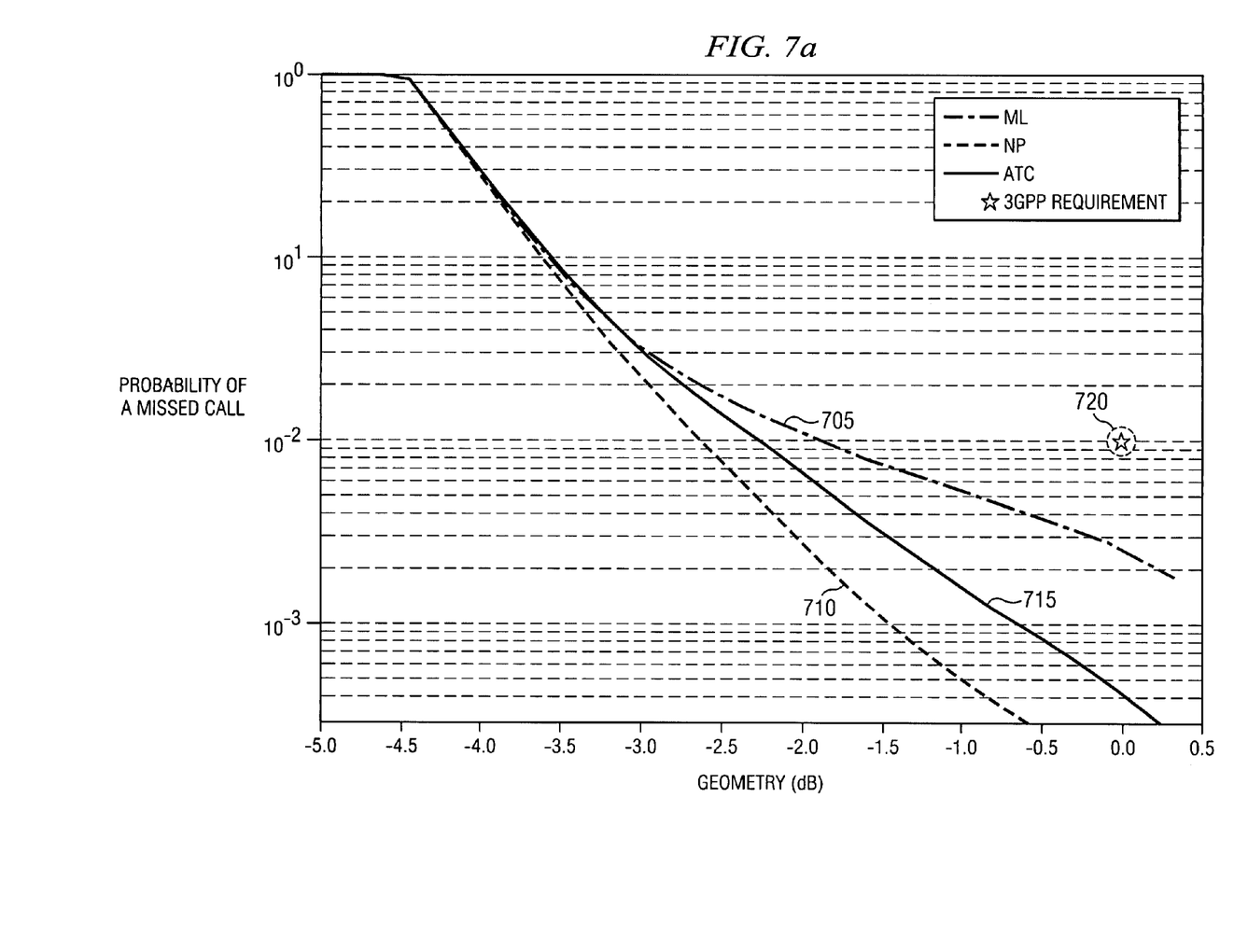
FIGS. 7a and 7b are data plots illustrating the probability of missed calls and average awake times for different PICH detection techniques in a static channel environment, according to a preferred embodiment of the present invention.
Figure 7B:
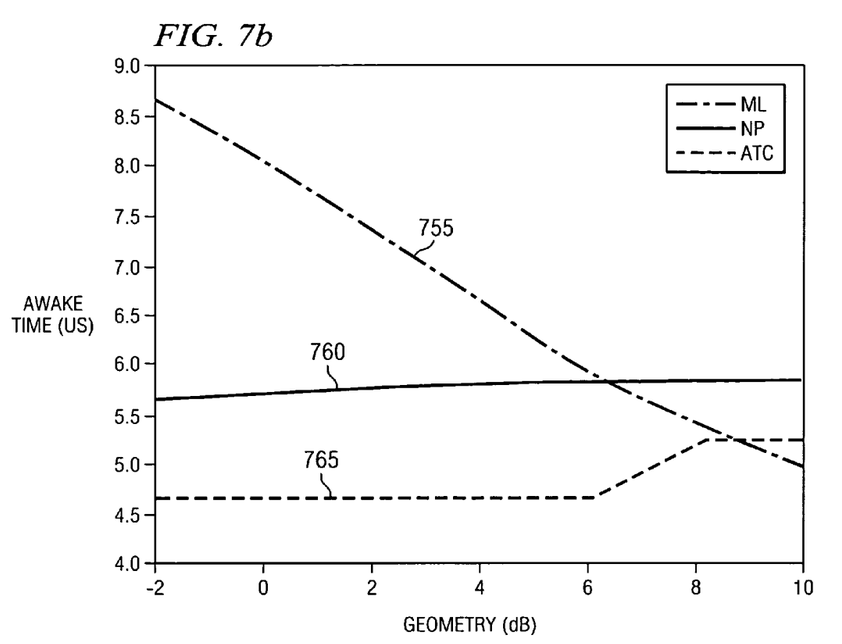

With reference now to FIGS. 7a and 7b, there are shown data plots illustrating probability of missed calls and average awake times for different PICH detection techniques in a static channel environment, according to a preferred embodiment of the present invention. The data plots shown in FIGS. 7a and 7b compare the performance of ATC with that of ML and NP techniques using link level simulations. In the NP technique, a target of 5% PICH false alarm probability for all SNRs was used. For ATC, a missed PICH detect probability of 40% was used until SNR reached −2 dB. After SNR exceeded −2 dB, the false alarm probability was set at 5%. One motivation for such a custom response can be that at low SNRs, the missed call rate is little influenced by the missed PICH detection, therefore, the false alarm probability was improved. Then, as the SNR increased, the false alarm rate was fixed at 5% while the missed PICH detection probability was decreased. Note that the custom response used in the simulations is used merely for illustration. In practice, a smoother custom response may be preferred.

FIG. 7a illustrates the simulation results for missed call probability for a channel with additive white Gaussian noise (AWGN). A first curve 705 shows the performance of the ML technique, a second curve 710 shows the performance of the NP technique, while a third curve 715 shows the performance using ATC. A point 720 displays the required performance of a UMTS wireless communications system as specified in the technical standards. FIG. 7b illustrates the simulation results for average awake time for the same AWGN channel, wherein a fourth curve 755 shows the performance for the ML technique, a fifth curve 760 shows the performance for the NP technique, and a sixth curve 765 shows the performance using ATC.

In FIG. 7a, it is shown that the NP technique (the first curve 705) offers better performance than ATC (the third curve 715) for missed call performance. However, when viewed in conjunction with the awake times shown in FIG. 7b, it is clear that ATC provides a better average awake time (the sixth curve 765 as opposed to the fourth curve 755). In general, ATC provides both good missed call and awake time performance.

Note that the results shown in FIGS. 7a and 7b are for a single specified set of missed PICH detection and false alarm probabilities as a function of signal geometry and that for the single specified set, NP performed better than ATC in missed call performance but ATC offered a lower average awake time. It is important to note that it is possible to specify the missed PICH detection and false alarm probabilities as a function of SNR so that ATC will perform identical to NP and/or ML. Therefore, the performance of ATC shown in FIGS. 7a and 7b is the result of the desire to emphasize average awake time (thereby increasing battery life) over missed call performance. Furthermore, NP also benefits from the correct accounting of the channel estimation error as described earlier in this disclosure. The techniques for setting the detection threshold for ATC can also be applied to setting the detection threshold for NP, and as a result, the performance of NP can be improved. Finally, it should be noted that both ATC and NP perform better than the traditional ML approach. This is the result of the setting of the detection threshold and the correct accounting of the channel estimation quality.

Figure 8A:
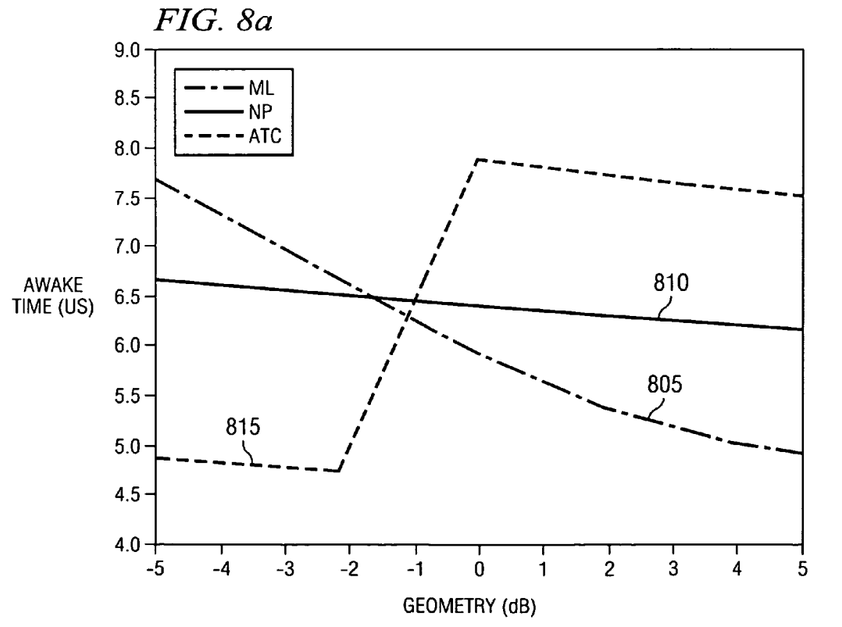
FIGS. 8a and 8b are data plots illustrating the probability of missed calls and average awake times for different PICH detection techniques in a fading channel environment, according to a preferred embodiment of the present invention.
Figure 8B:
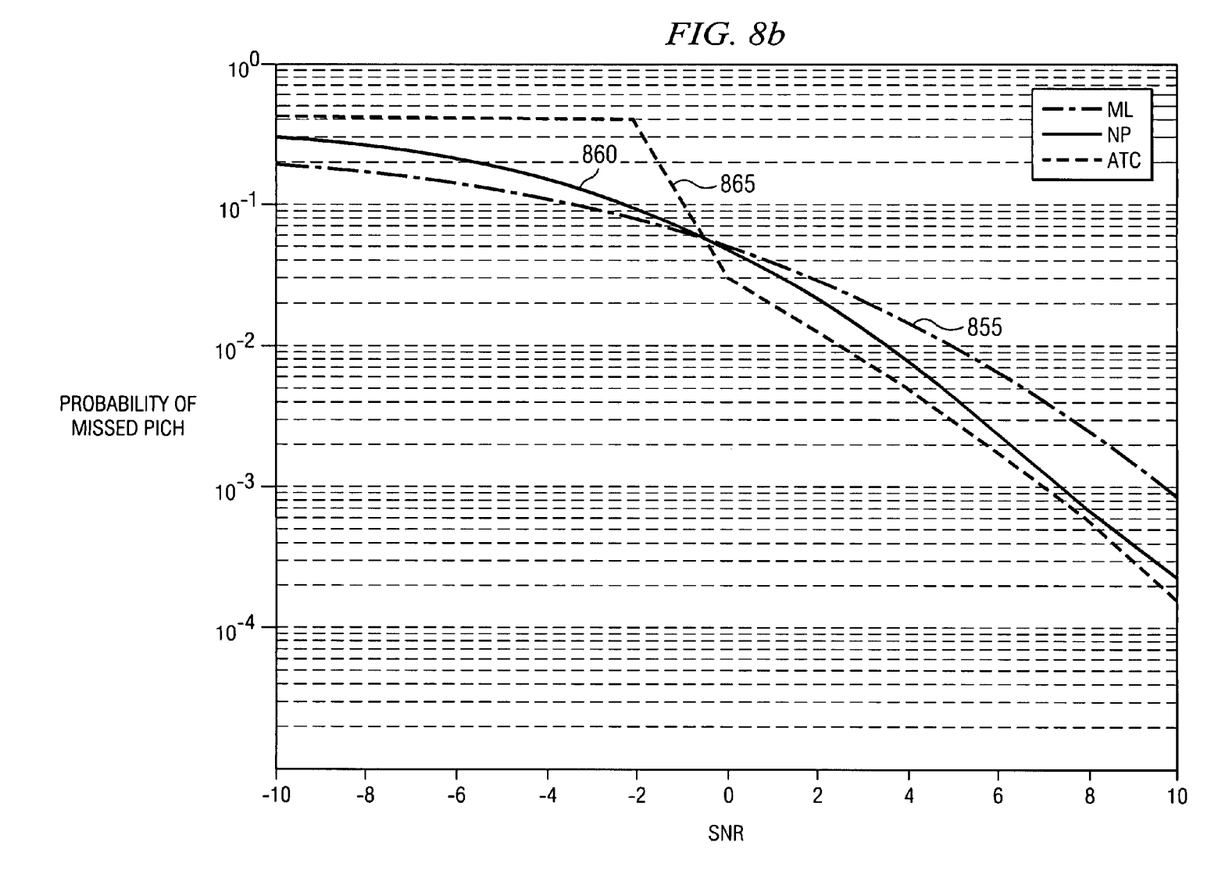

With reference now to FIGS. 8a and 8b, there are shown data plots illustrating average awake times and probability of missed PICH for different PICH detection techniques in a fading channel environment, according to a preferred embodiment of the present invention. The data plots shown in FIGS. 8a and 8b compare the performance of ATC with that of ML and NP techniques using link level simulations. The same false alarm and missed PICH detection probabilities used in the simulations to obtain the results shown in FIGS. 7a and 7b are used to obtain the results shown in FIGS. 8a and 8b.

FIG. 8a illustrates the simulation results for average awake times for a three path equal energy Rayleigh fading channel, wherein a first curve 805 shows the performance for the ML technique, a second curve 810 shows the performance for the NP technique, and a third curve 815 shows the performance using ATC. FIG. 8b illustrates the probability of missed PICH detection for a three path equal energy Rayleigh fading channel, wherein a fourth curve 855 shows the performance for the ML technique, a fifth curve 860 shows the performance of the NP technique, and a sixth curve 865 shows the performance using ATC.

In FIG. 8a, it is shown that when the channel conditions are poor, ATC (the third curve 815) offers a lower average awake time than either the ML (the first curve 805) or the NP (the second curve 810) techniques. However, when the channel conditions are good, ATC offers a longer average awake time. However, when the results of FIG. 8b are examined, it is clear that ATC is trading off longer average awake times to achieve a lower missed PICH detection probability (the sixth curve 865).

Figure 9:
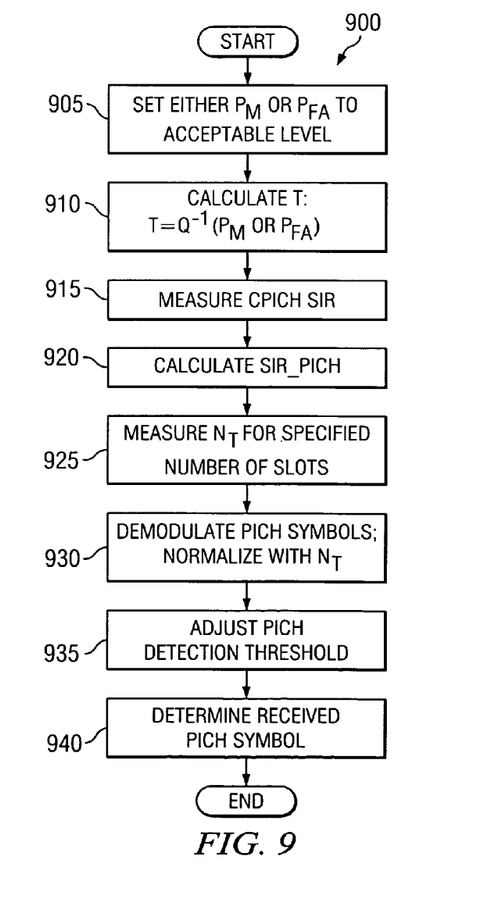
FIG. 9 is a diagram of an algorithm for use in decoding a received PICH symbol, according to a preferred embodiment of the present invention.

With reference now to FIG. 9, there is shown a flow diagram illustrating an algorithm 900 for use in decoding a received PICH symbol, according to a preferred embodiment of the present invention. The algorithm 900 shows the decoding of a received PICH symbol based upon a single specified value for either the missed PICH detection or false alarm probability. The algorithm 900 can therefore be an implementation of the algorithms 500 and 550 (FIGS. 5a and 5b) for a single SNR range when ATC is used or for an entire range of possible signal SNRs when NP is used. The algorithm 900 can be executed on a controller, a processing element, a general purpose processor, a dedicated processor, a custom designed integrated circuit, or so forth, of a communications device that is operating in DRX operating mode.

Portions of the algorithm 900 can be executed prior to the communications device entering DRX operating mode. Before the communications device enters the DRX operating mode, such as during an initial power-up configuration or during manufacture, a decision can be made on setting an acceptable value of either $P_m$ or $P_{fa}$ (block 905). Note that the value chosen for $P_m$ or $P_{fa}$ may need to be adherent to the technical standards specifying the operation of the communications device. After setting a value for $P_m$ or $P_{fa}$, then T is calculated (block 910), wherein $T=Q^{-1}(P_m)$ or $T=Q^{-1}(P_{fa})$, wherein T is the value of the inverse complementary error function for a specific value, such as $P_m$ or $P_{fa}$. Note that the calculation of T may need to be performed one time and the result can be stored in a memory (or register) for subsequent use. It may also be possible to store the values of T for different values of $P_m$ or $P_{fa}$ so that the calculation may not need to take place. The values of T can simply be written to a look-up table during the manufacture (or programming) of the communications device.

With T calculated for the set value of $P_m$ or $P_{fa}$, the communications device can enter the DRX operating mode, wherein at each DRX cycle, the controller of the communications device can measure the SIR (signal-to-interference ratio) of the CPICH (block 915). The SIR of the CPICH can be used to determine the threshold to be used. The SIR of the CPICH can be measured in two different ways. A first way to measure the CPICH SIR can be to assign the fingers of the rake receiver and measure CPICH $E_s$ and $N_t$ over a certain number of slots. Based upon the measured $E_s$ and $N_t$ of the CPICH, the CPICH SIR can be computed as: SIR_CPICH=$E_s/N_t$ in dB. Note that it is preferred that $E_s$ and $N_t$ be measured over a period of three (3) slots. Alternatively, searcher hardware (a part of the communications device used to perform correlations) can be used to calculate the CPICH Ec/Io in dB. Using Ec/Io, the CPICH SIR can be computed as:

$$\text{SIR\_CPICH} = CPICH\frac{Ec}{Io} - 10\log_{10}\left(1 + \frac{I_{or}}{I_{oc}}\right) + \log_{10}(SF_{CPICH})$$

wherein Ec/Io is a ratio of average power in the second channel to total signal power, Ior is the power spectral density of a band limited white noise source, Ioc is the received power spectral density of a signal measured at a receiver, $SF_{CPICH}$ is the spreading factor of CPICH. The alternate method for calculating CPICH SIR can be accurate at low geometric factors since the second term (the term containing Ior/Ioc) is not present at the communications device.

From the CPICH SIR, the PICH SIR can be calculated (block 920). The PICH SIR can be calculated from the CPICH SIR (calculated in block 815) using the expression:

$$\text{SIR\_PICH} = \text{SIR\_CPICH} + PICH_{PowerOffset} + 10\log_{10}\left(\frac{SF_{PICH} \cdot N}{SF_{CPICH}}\right),$$

wherein SIR_PICH is the SIR of the PICH, SIR_CPICH is the SIR of the CPICH, $PICH_{PowerOffset}$ is the power offset of the PICH, $SF_{PICH}$ and $SF_{CPICH}$ are the spreading factors of the PICH and the CPICH, and N is the number of bits carrying indicators in the PICH divided by the number of unique paging indicators and is equal to 288/Np (for a UMTS wireless communications system). After calculating the PICH SIR from the CPICH SIR, the controller can again measure Nt for a number of slots (block 925), preferably three (3), and demodulate symbols being transmitted on the PICH (block 930). The demodulated PICH symbols can then be normalized by the measured $N_t$. The PICH detection threshold can then be adjusted (block 935), using the PICH SIR calculated previously. Depending upon the probability being optimized ($P_m$ or $P_{fa}$), the PICH detection threshold can be adjusted using the techniques discussed previously. Then, using the PICH detection threshold, from block 935, the value of the normalized PICH symbols, y, can be determined (block 940).

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to

What is claimed is:

1. A method for detecting a value transmitted on a channel received by a receiver, the channel having a range of potential signal-to-noise ratios (SNRs), the method comprising:
   inferring a signal-to-noise ratio for the channel;
   selecting a channel detection threshold based upon the inferred SNR, wherein the channel detection threshold is based upon a missed channel detection probability when the inferred SNR is in a first set of the potential SNRs, and wherein the channel detection threshold is based upon a false alarm probability when the inferred SNR is in a second set of the potential SNRs; and
   applying a detection rule using the selected channel detection threshold.

2. The method of claim 1, wherein the inferred SNR for the channel is inferred from an estimate of a SNR from a second channel.

3. The method of claim 2, wherein the channel is signaled by a network, wherein the second channel is also signaled by the network, and a power offset between the channel and the second channel is known.

4. The method of claim 1, wherein the inferred SNR for the channel is directly estimated.

5. The method of claim 1, wherein ranges for the first and second sets of SNRs are determined before they are needed and are stored in a memory.

6. The method of claim 1, wherein the applying comprises:
   receiving symbols transmitted on the channel; and
   determining the value of the symbols based upon the threshold.

7. The method of claim 6, wherein the receiver has a rake receiver with a plurality of fingers, wherein each finger is assigned to receive data from a unique path, wherein the rake receiver uses maximal ratio combining (MRC) to combine data from the fingers, and wherein the determining comprises:
   for data from each path,
      estimating received channel bit energy for the path from an estimate of bit energy from a second channel;
      computing a channel estimate for the path;
      computing a noise variance estimate for the path; and
   applying the detection rule.

8. The method of claim 7, wherein the detection rule is expressed as:

$$L_{log}(x) = \sum_{i=1}^{L} -\frac{4}{\hat{\sigma}_i^2} \text{Re}\{\hat{\alpha}_i \sqrt{E} \, e^{-j\hat{\theta}_i} x_i\} \underset{H_0}{\overset{H_1}{\gtrless}} \log(\gamma)$$

wherein: $L_{log}(x)$ is the log-likelihood ratio of the channel, $\hat{\alpha}^2 \hat{E}_b^{CPICH}$ is the estimate of bit energy from the second channel, $\Delta_{PICH}$ is the channel to the second channel offset (in dB), $\hat{\alpha}_i^2 \hat{E}_P = \alpha_i^2 \hat{E}_C * 10^{\Delta_{PICH}/10}$ is the relationship between the estimated received channel bit energy and the bit energy of the second channel, $\hat{\theta}_i$ is the channel estimates for each path, $\hat{\sigma}_i^2$ is the noise variance for each path, and $\log(\gamma)$ is the threshold.

9. The method of claim 7, wherein the threshold is further determined based upon the quality of the channel estimation.

10. The method of claim 6, wherein the receiver has a rake receiver with plurality of fingers, wherein each finger is assigned to receive data from a unique path, wherein the rake receiver uses pilot weighted combining (PWC) to combine data from the fingers, and wherein the determining comprises:
    for data from each path,
       estimating received channel bit energy for the path from an estimate of bit energy from a second channel;
       computing a channel estimate for the path; and
    applying the detection rule.

11. The method of claim 10, wherein the detection rule is expressed as:

$$L_{log}(x) = \sum_{i=1}^{L} -\text{Re}\{\hat{\alpha}_i \sqrt{E_P} \, e^{-j\hat{\theta}_i} x_i\} \underset{H_0}{\overset{H_1}{\gtrless}} \log(\tilde{\gamma})$$

wherein: $L_{log}(x)$ is the log-likelihood ratio of the channel, $\hat{\alpha}^2 \hat{E}_b^{CPICH}$ is the estimate of bit energy from the second channel, $\Delta_{PICH}$ is the channel to the second channel offset (in dB), $\hat{\alpha}_i^2 \hat{E}_P = \alpha_i^2 \hat{E}_C * 10^{\Delta_{PICH}/10}$ is the relationship between the estimated received channel bit energy and the bit energy of the second channel, $\hat{\theta}_i$ is the channel estimates for each path, $\hat{\sigma}_i^2$ is the noise variance for each path, and $\log(\gamma)$ is the threshold.

12. The method of claim 10, wherein the threshold is further determined based upon the quality of the channel estimation.

13. A method for customizing detection of a value transmitted on a channel received by a receiver, the method comprising:
    specifying a desired response for a missed channel detection probability and a false alarm probability for a plurality of signal qualities;
    determining whether a channel detection threshold is based on missed channel detection probability or false alarm probability for each of the plurality of signal qualities;
    setting the channel detection threshold based upon the determining at the each of the plurality of signal qualities, wherein one or more channel detection thresholds are based on the missed channel detection probability and one or more other channel detection thresholds are based on the false alarm probability;
    inferring a signal-to-noise ratio (SNR) for the channel;
    selecting one of the channel detection thresholds based upon the inferred SNR; and
    applying a detection rule using the selected channel detection threshold.

14. The method of claim 13, wherein the inferred SNR for the channel is either inferred from an estimate of a SNR from a second channel or directly estimated.

15. The method of claim 14, wherein the channel and the second channel are transmitted by the same source.

16. The method of claim 15, wherein the method is used in a Universal Mobile Telephony System (UMTS) compliant communications system, and wherein the channel is a paging indicator channel (PICH) and the second channel is a broadcast common pilot channel (CPICH).

17. The method of claim 13, wherein the specifying comprises specifying a desired missed channel detection probability and false alarm probability for each of the plurality of signal qualities.

18. The method of claim 17, each of the plurality of signal qualities spans an SNR range.

19. The method of claim 13, wherein multiple desired responses are specified, each for a different operating condition, and wherein the determining is applied to each desired response and the results of the determining for each desired response stored for subsequent use.

20. The method of claim 19, wherein the determining is based upon the inferred channel SNR and the results for a desired response selected based upon operating conditions.

21. The method of claim 13, wherein the selecting is also based upon results from the setting.

22. The method of claim 13, further comprising:
receiving symbols transmitted on the channel; and
determining the value of the symbols based upon the threshold.

23. The method of claim 22, wherein the receiver has a rake receiver with a plurality of fingers, wherein each finger is assigned to receive data from a unique path, wherein the rake receiver uses maximal ratio combining (MRC) to combine data from the fingers, and wherein the second determining comprises:
for data from each path,
estimating received channel bit energy for the path from an estimate of bit energy from a second channel;
computing a channel estimate for the path;
computing a noise variance estimate for the path; and
applying the detection rule.

24. The method of claim 23, wherein the detection rule is expressed as:

$$L_{log}(\underline{x}) = \sum_{i=1}^{L} -\frac{4}{\hat{\sigma}_i^2} \text{Re}\{\hat{\alpha}_i \sqrt{E} e^{-j\hat{\theta}_i} x_i\} \overset{H_1}{\underset{H_0}{\gtrless}} \log(\gamma)$$

wherein: $L_{log}(x)$ is the log-likelihood ratio of the channel, $\hat{\alpha}^2 \hat{E}_b^{CPICH}$ is the estimate of bit energy from the second channel, $\Delta_{PICH}$ is the channel to the second channel offset (in dB), $\hat{\alpha}_i^2 \hat{E}_P = \hat{\alpha}_i^2 \hat{E}_C * 10^{\Delta_{PICH}/10}$ is the relationship between the estimated received channel bit energy and the bit energy of the second channel, $\hat{\theta}_i$ is the channel estimates for each path, $\hat{\sigma}_i^2$ is the noise variance for each path, and $\log(\gamma)$ is the threshold.

25. The method of claim 22, wherein the receiver has a rake receiver with a plurality of fingers, wherein each finger is assigned to receive data from a unique path, wherein the rake receiver uses pilot weighted combining (PWC) to combine data from the fingers, and wherein the second determining comprises:
wherein for data from each path,
estimating received channel bit energy for the path from an estimate of bit energy from a second channel;
computing a channel estimate for the path; and
applying the detection rule.

26. The method of claim 25, wherein the detection rule is expressed as:

$$L_{log}(\underline{x}) = \sum_{i=1}^{L} -\text{Re}\{\hat{\alpha}_i \sqrt{E_P} e^{-j\hat{\theta}_i} x_i\} \overset{H_1}{\underset{H_0}{\gtrless}} \log(\tilde{\gamma})$$

wherein: $L_{log}(x)$ is the log-likelihood ratio of the channel, $\hat{\alpha}^2 \hat{E}_b^{CPICH}$ is the estimate of bit energy from the second channel, $\Delta_{PICH}$ is the channel to the second channel offset (in dB), $\hat{\alpha}_i^2 \hat{E}_P = \hat{\alpha}_i^2 \hat{E}_C * 10^{\Delta_{PICH}/10}$ is the relationship between the estimated received channel bit energy and the bit energy of the second channel, $\hat{\theta}_i$ is the channel estimates for each path, $\hat{\sigma}_i^2$ is the noise variance for each path, and $\log(\gamma)$ is the threshold.

27. The method of claim 13, wherein the specifying, determining, and setting are performed at an earlier time and results stored for later use.

* * * * *